Figures 1, 2:
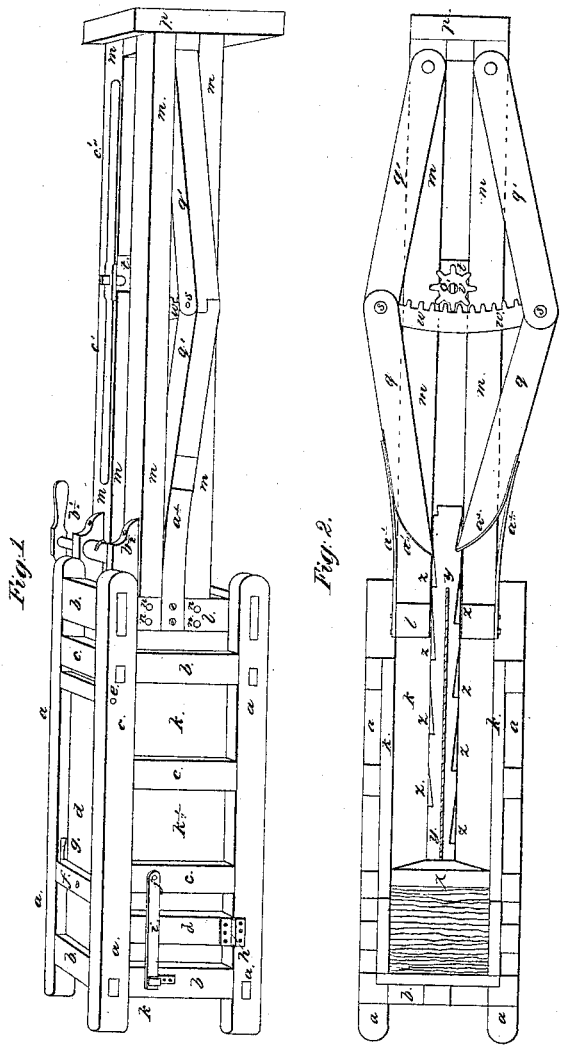

J. C. Baldwin

Cotton Press.

Nº 1,086.   Patented Feb. 22, 1839.

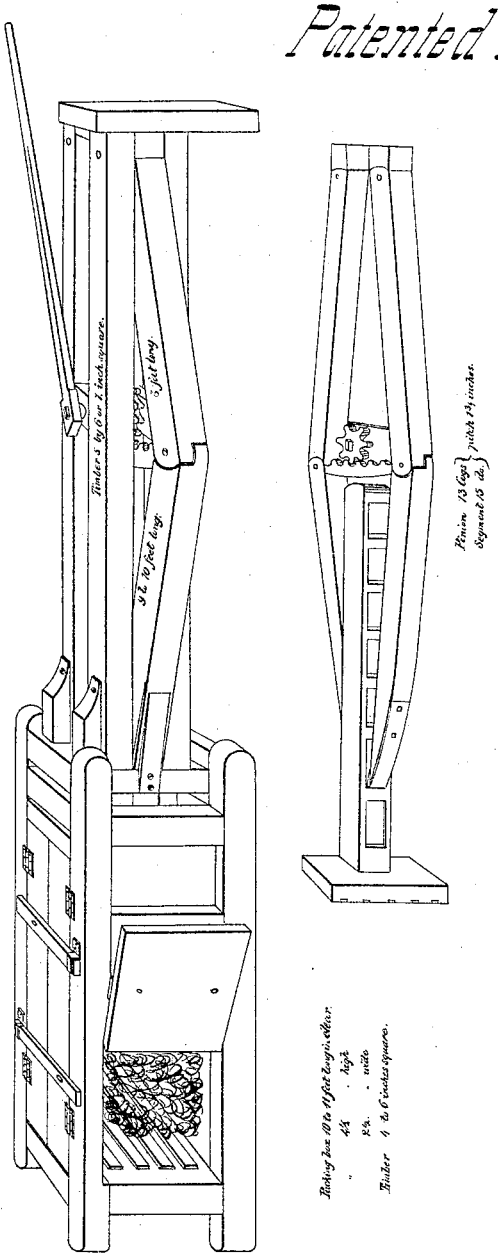

UNITED STATES PATENT OFFICE.

JOSEPH C. BALDWIN, OF STAUNTON, VIRGINIA.

IMPROVEMENT IN PRESSES FOR PRESSING HAY, COTTON, &c.

Specification forming part of Letters Patent No. 1,086, dated February 22, 1839.

*To all whom it may concern:*

Be it known that I, JOSEPH C. BALDWIN, of Staunton, in the county of Augusta and State of Virginia, have invented a new and useful Improvement in Machines for Pressing Hay, Cotton, &c.; and I do hereby declare that the following is a full and exact description thereof, reference being had to the drawings accompanying and making part of this specification.

The improvement herein referred to, and which constitutes my invention, consists in a pressure obtained by the employment of double-jointed levers, operating as pawls into notches in a piston-rod by a horizontal motion obtained by a rack and pinion, as will be hereinafter described.

Figure 1 of the drawings is a perspective view of the press; Fig. 2, a longitudinal section through the center, both showing it in a horizontal, or in that position in which it is used.

The box or receptacle into which the substance to be solidified is placed is constructed in the form of a parallelopiped, the longitudinal pieces of the frame-work of which (represented at $a$, Figs 1 and 2) are connected together at each end by the transverse pieces $b$ by mortise and tenon in the usual manner. Other transverse pieces, such as represented at $c$, Fig. 1, may be added, if desired, to give greater strength. In the top side of the box a door, $d$, Fig. 1, opens and swings upon the pivot $e$, Fig. 1, in the longitudinal pieces $a$, and when shut is confined by a button, $f$, Fig. 1, which extends entirely across its width and works into mortises $g$, Fig. 1, in the inside of the longitudinal pieces. This door comprises nearly one side of the box, opens and shuts for the purpose of "filling in," and may be made to operate by any convenient method other than the one above described. On each of the sides of the box smaller doors are also made to swing open or up and down, (as found most feasible,) on a hinge, $h$, Fig. 1, or hinges, and when closed are confined by the cross-bar or latch $i$, which swings on a pin, $j$, working into a catch, $k$, or they may operate in any convenient manner. Those parts of the sides of the box which are not employed as doors are supplied with casings $k'$, Figs. 1 and 2, fitted to the inside of the frame-work. Two additional transverse pieces, $l$, Figs. 1 and 2, are attached to the transverse pieces $b$ on that end of the box which I denominate the "inner," from which four arms, $m$, Figs. 1 and 2, (two from each,) about equal in length to that of the box, extend outward on a line parallel with that of the box, their inner ends being attached to the transverse pieces by bolts $n$, Fig. 1, or in any other substantial manner, and the outer fitted by mortise and tenon to a cap, $p$, Figs. 1 and 2. A sufficient space is left between the arms to admit the thickness of the two levers $q$, Figs. 1 and 2. These levers turn on a pivot, $r$, Fig. 2, passing through the outer ends of two of the arms, and extend along in the space between the arms to the inner end of the box, where, being brought to a point, and cased with metal $d'$, Fig. 2, they work as pawls into notches cast in the piston-rod, which will be hereinafter described. At their centers they are cut, lapped, and connected by a pin, S, Figs. 1 and 2, thus forming a hinge-joint, and converted into double-jointed levers. In that space between the arms $m$ which is not filled by the levers two blocks, $t$, Fig. 1, and $w$, Fig. 2, are fitted, which form the bearings of the journal of a pinion, $v$, Fig. 2, which works into a rack, $w$, Figs. 1 and 2. This rack constitutes the segment of a circle or rim, with teeth on the inner side, and is connected at each end to the joint of levers by the pin $s$ passing through them. Y, Fig. 2, represents the piston-rod of the follower X, which is made to work forward in the box by the action of the levers, which, in their horizontal motion, fit alternately into notches $z$, Fig. 2, in piston-rod. This alternate action and horizontal motion of the levers is caused by the revolution of the pinion working into the rack, which revolution is but partial, as it can revolve no farther than until it comes to the end of the rack, when, in order to produce action it must be turned in a contrary direction. It will be readily seen that while one of the levers is progressing and pushing up the piston-rod, the other must retrograde preparatory to coming in contact with the next notch, and when it meets the notch it is thrown into it by the action of a spring, $a'$, Figs. 1 and 2, attached to the transverse pieces $l$, and pressing against its side. That lever which has performed its office remains in a straight line with the arms $m$, while the other is bent outward, thus working backward and forward horizontally until the pressing is completed, when they are relieved from the notches by hand or any convenient apparatus.

b', Figs. 1 and 2, represents a windlass and rope intended to be used to draw back the piston, but as it is found that this operation can easily be performed by hand, it is not necessary to describe it, nor its mode of operation.

C', Fig. 1, is a lever attached to the journal of the pinion, to which the motive power is applied.

What I claim as my invention, and desire to secure by Letters Patent, is—

The rack and pinion, in combination with the double-jointed levers, working as pawls into notches in the piston-rod, as before described.

JOS. C. BALDWIN.

Witnesses:
JOHN W. HUBBARD,
GEO. NAYLOR.